(12) United States Patent
Sagisaka et al.

(10) Patent No.: US 10,142,143 B2
(45) Date of Patent: *Nov. 27, 2018

(54) RECEIVING APPARATUS AND DEMODULATION METHOD

(71) Applicant: Panasonic Corporation, Osaka (JP)

(72) Inventors: Masahiko Sagisaka, Kyoto (JP); Yoichiro Horiuchi, Kanagawa (JP)

(73) Assignee: PANASONIC CORPORATION, Osaka (JP)

(*) Notice: Subject to any disclaimer, the term of this patent is extended or adjusted under 35 U.S.C. 154(b) by 17 days.

This patent is subject to a terminal disclaimer.

(21) Appl. No.: 14/649,403

(22) PCT Filed: Dec. 20, 2013

(86) PCT No.: PCT/JP2013/007497
§ 371 (c)(1),
(2) Date: Jun. 3, 2015

(87) PCT Pub. No.: WO2014/103267
PCT Pub. Date: Jul. 3, 2014

(65) Prior Publication Data
US 2016/0134451 A1 May 12, 2016

(30) Foreign Application Priority Data

Dec. 27, 2012 (JP) ................. 2012-284355

(51) Int. Cl.
*H04L 27/00* (2006.01)
*H04L 27/14* (2006.01)
(Continued)

(52) U.S. Cl.
CPC ............ *H04L 27/14* (2013.01); *H04L 27/144* (2013.01); *H04L 27/16* (2013.01)

(58) Field of Classification Search
CPC ....... H04L 27/14; H04L 27/144; H04L 27/28; H04L 27/265
See application file for complete search history.

(56) References Cited

U.S. PATENT DOCUMENTS

| | | | | |
|---|---|---|---|---|
| 3,047,659 A | * | 7/1962 | Costas | .................. H04L 27/18 375/270 |
| 3,047,660 A | * | 7/1962 | Costas | .................. H04L 27/18 375/329 |

(Continued)

FOREIGN PATENT DOCUMENTS

| | | |
|---|---|---|
| JP | S61-065171 A | 4/1986 |
| JP | 07-107128 A | 4/1995 |

(Continued)

OTHER PUBLICATIONS

Watkins-Johnson Company Tech-notes: "FSK: Signals and demodulation", vol. 7, No. 5, Sep.-Oct. 1980, Retrieved from the Internet: URL: http://edge.rit.edu/edge/P09141/public/FSK.pdf [retrieved on Mar. 5, 2016].*

(Continued)

*Primary Examiner* — Berhanu Tadese
(74) *Attorney, Agent, or Firm* — Pearne & Gordon LLP

(57) ABSTRACT

This receiving apparatus achieves circuit size reduction and consumption power reduction, while still having an advantage of high-speed processing. In a receiving apparatus (100), a frequency component detector (105) has a Fourier conversion operation unit provided therein, and performs high-speed Fourier conversion with respect to digital signals outputted from an ADC (104), said high-speed Fourier conversion being performed within a range instructed by means of an operation range control unit (106), and the frequency component detector detects a plurality of frequency components (FFT signals) of the digital signals. The operation range control unit (106) sets, using the FFT signals (Continued)

outputted from the frequency component detector (105), the frequency range within which the Fourier conversion operation is to be performed, and instructs the range to the frequency component detector (105).

5 Claims, 7 Drawing Sheets

(51) Int. Cl.
*H04L 27/144* (2006.01)
*H04L 27/16* (2006.01)

(56) References Cited

U.S. PATENT DOCUMENTS

| | | | | |
|---|---|---|---|---|
| 3,454,718 A * | 7/1969 | Perreault | H04L 27/10 | 327/113 |
| 3,497,625 A * | 2/1970 | Oxley | H04L 27/0008 | 329/311 |
| 3,899,741 A * | 8/1975 | Brandt | H04L 27/148 | 329/301 |
| 3,938,045 A * | 2/1976 | Mathwich | H04L 27/2014 | 375/305 |
| 3,993,868 A * | 11/1976 | Balcewicz | H04L 27/2014 | 375/274 |
| 4,054,842 A * | 10/1977 | Elliott | H04L 27/148 | 329/300 |
| 4,145,575 A * | 3/1979 | Shida | H04J 1/08 | 370/482 |
| 4,234,852 A * | 11/1980 | McCorkle | H04L 27/144 | 329/302 |
| 4,481,642 A * | 11/1984 | Hanson | H04L 27/10 | 375/223 |
| 4,616,187 A * | 10/1986 | Watanabe | H04L 27/1563 | 329/302 |
| 4,646,173 A * | 2/1987 | Kammeyer | H04L 7/0029 | 360/32 |
| 4,853,686 A * | 8/1989 | Kueng | H04B 7/24 | 340/9.1 |
| 4,866,771 A * | 9/1989 | Bain | H04L 27/122 | 713/155 |
| 5,155,446 A * | 10/1992 | Eberle | H04L 27/122 | 329/300 |
| 5,197,084 A * | 3/1993 | Fuhrman | H04L 27/14 | 375/334 |
| 5,208,835 A * | 5/1993 | Weeks | H04L 27/16 | 329/307 |
| 5,241,566 A * | 8/1993 | Jackson | H04L 27/1525 | 329/300 |
| 5,367,539 A * | 11/1994 | Copley | H04B 1/0003 | 375/347 |
| 5,425,053 A * | 6/1995 | Matsumoto | H04L 25/061 | 375/287 |
| 5,436,590 A * | 7/1995 | Simard | H04L 25/062 | 329/303 |
| 5,465,410 A * | 11/1995 | Hiben | H03G 5/24 | 455/182.2 |
| 5,633,898 A * | 5/1997 | Kishigami | H04L 27/1525 | 329/300 |
| 5,748,036 A * | 5/1998 | Lee | H04L 27/148 | 329/300 |
| 5,818,296 A * | 10/1998 | Lee | H04L 27/148 | 329/300 |
| 6,288,618 B1 * | 9/2001 | Stevenson | H04L 27/12 | 329/302 |
| 6,484,112 B1 * | 11/2002 | Scheppach | G01R 23/16 | 324/76.77 |
| 6,650,712 B1 * | 11/2003 | Leonidov | H04L 27/1566 | 375/272 |
| 6,771,720 B1 * | 8/2004 | Yang | H03G 3/3068 | 375/345 |
| 6,898,235 B1 * | 5/2005 | Carlin | H04B 1/001 | 342/147 |
| 6,934,342 B1 * | 8/2005 | Ishii | H04B 1/406 | 375/224 |
| 7,006,555 B1 * | 2/2006 | Srinivasan | H04H 20/31 | 375/133 |
| 7,386,065 B2 * | 6/2008 | Tu | H04L 27/12 | 257/480 |
| 8,428,957 B2 * | 4/2013 | Garudadri | G10L 19/02 | 704/200 |
| 8,442,019 B2 * | 5/2013 | Trott | H04B 1/715 | 370/342 |
| 9,094,265 B1 * | 7/2015 | Sagisaka | H04L 27/14 | |
| 2002/0012405 A1 * | 1/2002 | Lee | G11C 16/26 | 375/300 |
| 2002/0167368 A1 * | 11/2002 | Yoshida | H04L 27/14 | 332/100 |
| 2003/0117923 A1 * | 6/2003 | Asada | G11B 7/0062 | 369/59.11 |
| 2006/0045222 A1 * | 3/2006 | Kim | G11B 7/00456 | 375/354 |
| 2007/0153947 A1 * | 7/2007 | Ha | H04L 27/1563 | 375/355 |
| 2008/0025439 A1 * | 1/2008 | Al-Eidan | H04L 27/12 | 375/334 |
| 2008/0101481 A1 * | 5/2008 | Al-Eidan | H04L 27/10 | 375/260 |
| 2009/0086856 A1 * | 4/2009 | Seki | H04L 27/152 | 375/344 |
| 2010/0061217 A1 * | 3/2010 | Katayama | G11B 7/1275 | 369/112.03 |
| 2010/0152600 A1 * | 6/2010 | Droitcour | A61B 5/05 | 600/534 |
| 2010/0316140 A1 * | 12/2010 | Razazian | H04B 3/54 | 375/257 |
| 2011/0281543 A1 * | 11/2011 | White | H04H 20/63 | 455/337 |
| 2012/0134238 A1 * | 5/2012 | Surprenant | H04S 1/007 | 367/137 |
| 2013/0223572 A1 * | 8/2013 | Cheng | H04B 1/0007 | 375/340 |
| 2014/0003823 A1 * | 1/2014 | Roberts | H04B 10/5563 | 398/187 |
| 2014/0169038 A1 * | 6/2014 | Kamath | H03D 3/00 | 363/16 |
| 2015/0244552 A1 * | 8/2015 | Sagisaka | H04L 27/144 | 375/335 |
| 2016/0134451 A1 * | 5/2016 | Sagisaka | H04L 27/144 | 375/334 |
| 2016/0182108 A1 * | 6/2016 | Takahashi | H04B 1/16 | 455/214 |

FOREIGN PATENT DOCUMENTS

| | | |
|---|---|---|
| JP | 09-130300 A | 6/1997 |
| JP | 2000-270030 A | 9/2000 |
| JP | 2003-273944 A | 9/2003 |
| JP | 2005-086552 A | 3/2005 |
| JP | 2007-189420 A | 7/2007 |
| JP | 2010-050546 A | 3/2010 |

OTHER PUBLICATIONS

International Search Report for Application No. PCT/JP2013/007497 dated Jan. 21, 2014.

* cited by examiner

RECEIVING APPARATUS AND DEMODULATION METHOD

TECHNICAL FIELD

The present disclosure relates to a receiving apparatus that receives and demodulates a frequency-shift keying (FSK) modulated signal, and also relates to a demodulation method.

BACKGROUND ART

A frequency-shift keying (FSK) modulation scheme that assigns values ("0" and "1") of a digital signal to mutually different frequencies to modulate the digital signal is known as a digital communication modulation scheme. Patent Literature (hereinafter, referred to as "PTL") 1 discloses an example of a demodulation scheme for a signal modulated using the FSK modulation scheme.

FIG. 1 is a block diagram illustrating a receiving apparatus (multilevel frequency-shift keying demodulator) disclosed in PTL 1. The receiving apparatus illustrated in FIG. 1 includes: antenna 1; primary demodulator 2, which conforms to a frequency hopping scheme; and secondary demodulator 3, which conforms to an M-FSK scheme (M-FSK demodulator). Primary demodulator 2 includes: mixer 5; frequency synthesizer 6; and hopping pattern generator 7. Secondary demodulator 3 includes: band-pass filter (BPF) 8; analog-to-digital (AD) converter 9; fast Fourier transformer (FFT) 10; maximum value selector 11; and decoding circuit 12.

Mixer 5 mixes a spread-spectrum signal received via antenna 1 and amplified by an amplifier (not illustrated) with a hopping local signal from frequency synthesizer 6 in synchronization with each other and despreads the spread-spectrum signal, thereby generating a primary demodulation signal. BPF 8 removes an unnecessary signal from the primary demodulation signal outputted from mixer 5. AD converter 9 converts the analog primary demodulation signal outputted from BPF 8 into a digital signal.

FFT 10 extracts the digital signal outputted from AD converter 9 in each pre-set time window and performs a fast Fourier transform and simultaneously detects a plurality of frequency components (FFT signal) of the digital signal.

Maximum value selector 11 detects a change in frequency components indicating a plurality of maximum amplitude values from the FFT signal outputted from FFT 10 and generates codeword data signal S1 having a plurality of codeword chips as a received signal in accordance with the change in frequency components. Moreover, maximum value selector 11 detects a maximum likelihood between codeword data signal S1 and codeword pattern data signal S2 of a plurality of kinds pre-set in accordance with bit pattern types of secondary demodulation data and selects codeword pattern data signal S2 having a highest matching degree with the codeword data.

Decoding circuit 12 decodes the codeword pattern data signal selected by maximum value selector 11 into a digital signal formed of a predetermined number of bits and outputs the digital signal as a secondary demodulation data signal (demodulated data).

As described above, the multilevel frequency-shift keying demodulator disclosed in PTL 1 performs a fast Fourier transform on an FSK modulation signal to detect a plurality of frequency components included in the modulation signal, thereby obtaining a data signal based on the plurality of frequency components. The technique disclosed in PTL 1 uses no envelope detector and requires no use of a plurality of band-pass filters. Thus, the technique disclosed in PTL 1 enables fast and accurate demodulation without variation in characteristics.

CITATION LIST

Patent Literature

PTL 1
Japanese Patent Application Laid-Open No. 9-130300

SUMMARY OF INVENTION

Technical Problem

The related art described above performs a Fourier transform operation on every frequency component, thus involving a large operation amount and leading to an increase in circuit scale and power consumption.

An object of the present disclosure is to achieve a reduction in circuit scale and power consumption in a receiving apparatus while keeping the advantage of being able to perform processing at high speed in the receiving apparatus.

Solution to Problem

A receiving apparatus according to an aspect of the present disclosure is a receiving apparatus that receives and demodulates a frequency-shift keying (FSK) modulated signal, the apparatus including: a frequency component detector that detects a frequency component of an FSK modulated digital signal; and an operation range control section that controls a frequency range used for an operation of the frequency component detector based on a Mark frequency and Space frequency.

A demodulation method according to an aspect of the present disclosure is a demodulation method for a frequency-shift keying (FSK) modulated signal, the method including: detecting a frequency component of an FSK modulated digital signal; and controlling a frequency range used for an operation to detect the frequency component, based on a Mark frequency and Space frequency.

Advantageous Effects of Invention

According to the present disclosure, a frequency range can be controlled so as to use some frequency components required for obtaining a desired demodulation accuracy in performing frequency detection processing, so that the operation amount of the frequency component detector can be reduced. Thus, the present disclosure can achieve a reduction in circuit scale and power consumption in a receiving apparatus while keeping the advantage of being able to perform processing at high speed in the receiving apparatus.

DESCRIPTION OF EMBODIMENT

Hereinafter, a description will be given of an embodiment of the present disclosure in detail with reference to the accompanying drawings. In the following description, binary FSK modulation will be used as an FSK modulation scheme.

Embodiment

Figure 1:
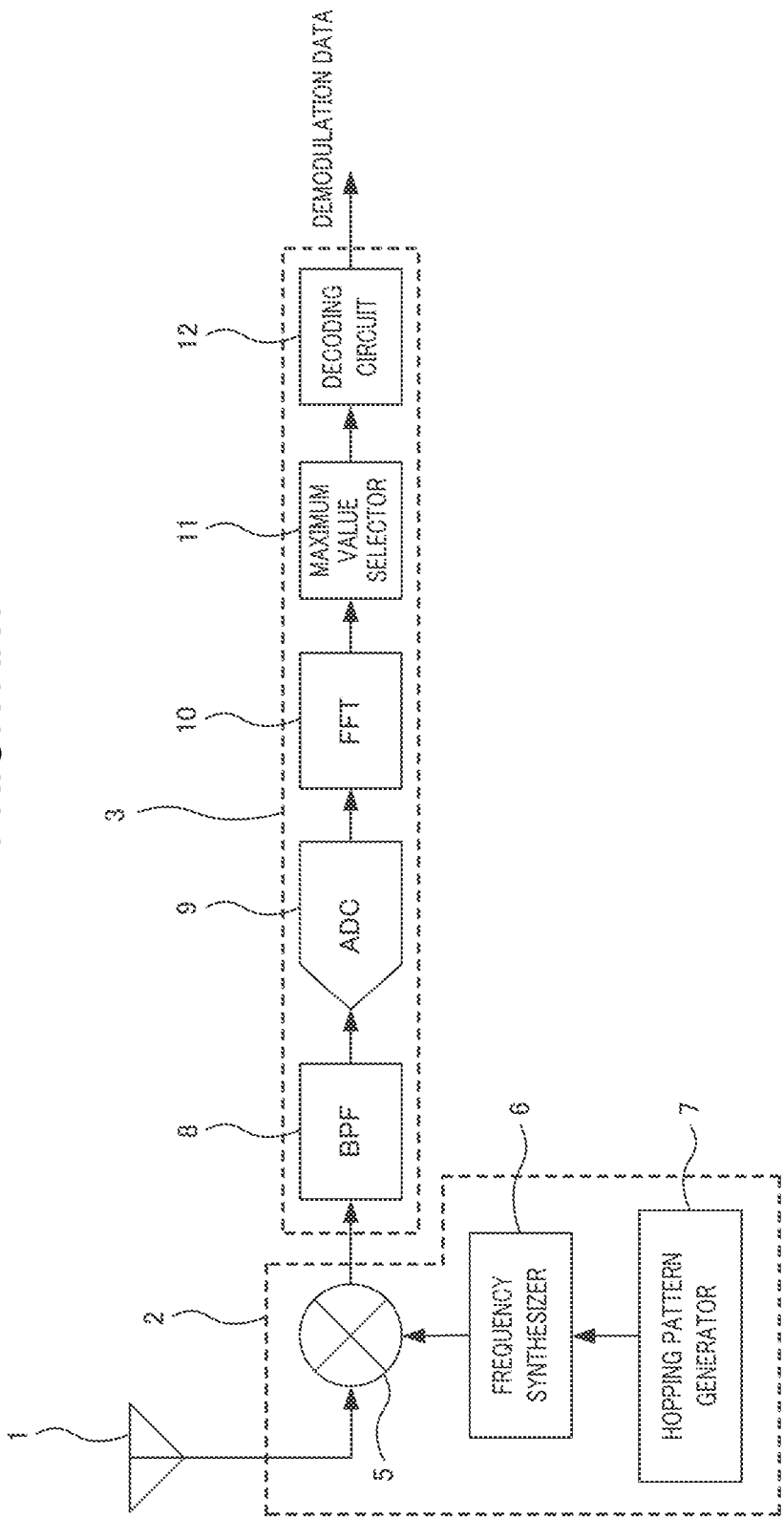
FIG. 1 is a block diagram illustrating a conventional receiving apparatus.
Figure 2:
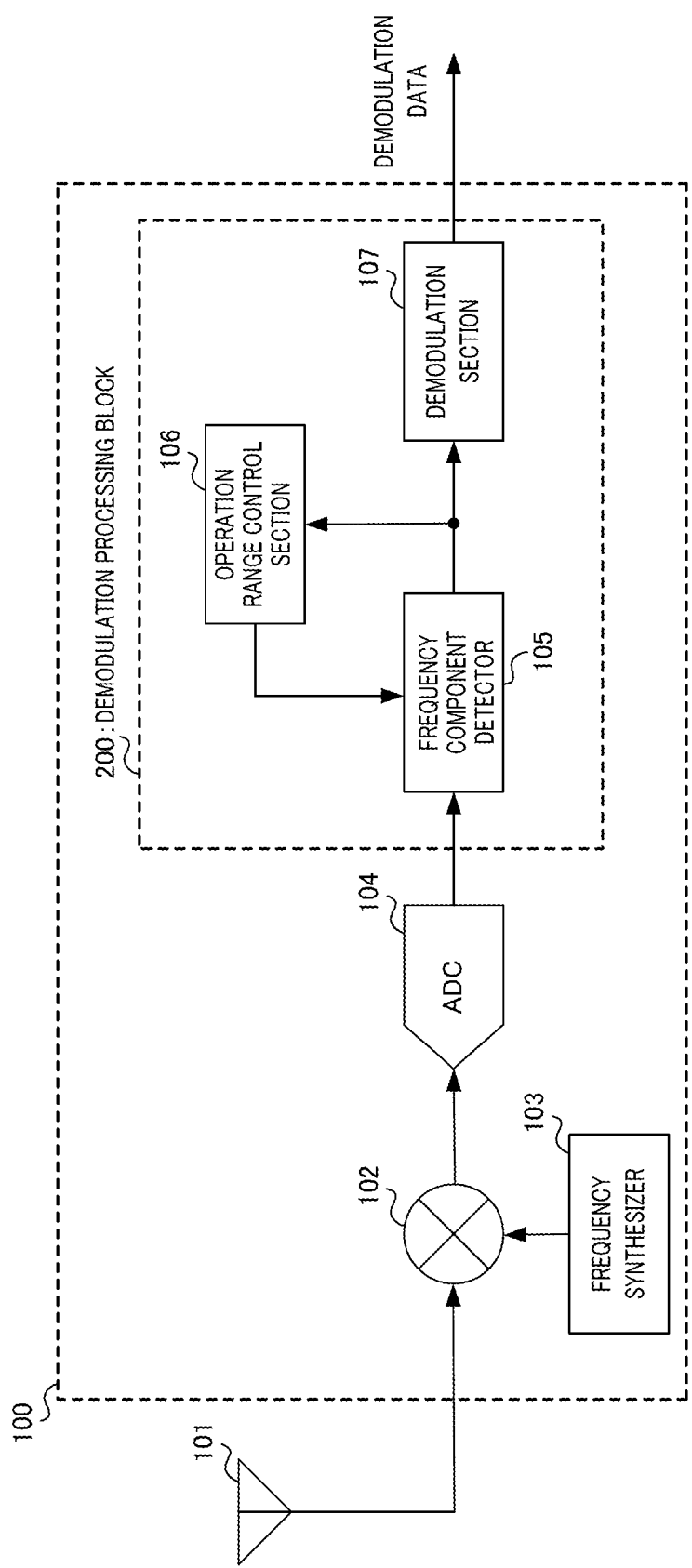
FIG. 2 is a block diagram illustrating a configuration of a receiving apparatus according to an embodiment of the present disclosure.

FIG. 2 is a block diagram illustrating a configuration of a receiving apparatus according to an embodiment of the present disclosure. As illustrated in FIG. 2, receiving apparatus 100 mainly includes antenna 101, mixer 102, frequency synthesizer 103, analog-to-digital converter (ADC) 104, and demodulation processing block 200. Demodulation processing block 200 includes frequency component detector 105, operation range control section 106, and demodulation section 107.

Mixer 102 mixes a radio frequency received signal that is received via antenna 101 and is amplified by an amplifier (not illustrated) with a local signal from frequency synthesizer 103 to generate an intermediate frequency analog signal and outputs the signal to ADC 104.

ADC 104 converts the analog signal outputted from mixer 102 into a digital signal and outputs the digital signal to frequency component detector 105.

Frequency component detector 105 internally includes a Fourier transform operating unit and performs a fast Fourier transform on the digital signal outputted from ADC 104 within a range indicated by operation range control section 106 and detects a plurality of frequency components (FFT signal) of the digital signal. The FFT signal is outputted to operation range control section 106 and demodulation section 107. Note that, a detailed description of frequency component detector 105 will be given, hereinafter.

Operation range control section 106 sets the frequency range for a Fourier transform operation, using the FFT signal outputted from frequency component detector 105 and indicates the set range to frequency component detector 105. Note that, a detailed description of operation range control section 106 will be given, hereinafter.

Demodulation section 107 decodes the FFT signal outputted from frequency component detector 105 into a digital signal formed of a predetermined number of bits and outputs the digital signal as a secondary demodulation data signal (demodulation data). Note that, a detailed description of demodulation section 107 will be given, hereinafter.

Figure 3A:
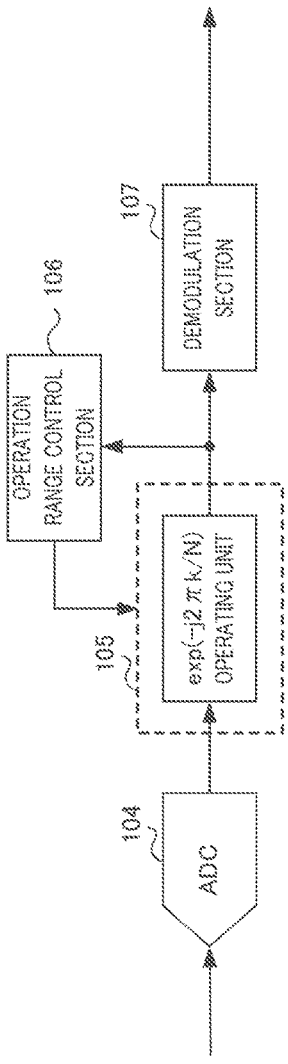
FIG. 3A is a block diagram illustrating a configuration of a frequency component detector of the receiving apparatus according to the embodiment of the present disclosure.
Figure 3B:
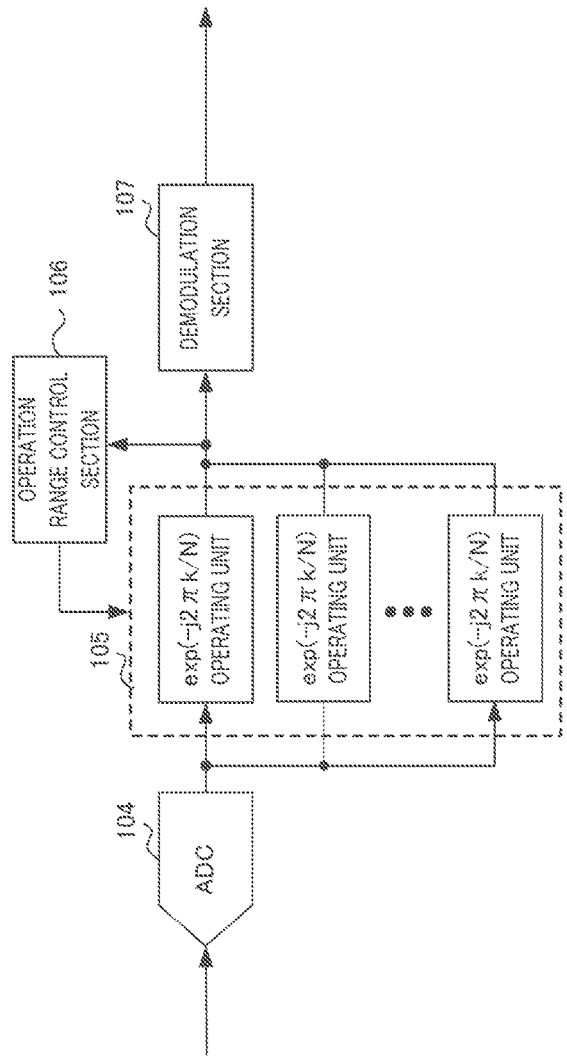
FIG. 3B is a block diagram illustrating a configuration of a frequency component detector of the receiving apparatus according to the embodiment of the present disclosure.

Next, a description will be given of an internal configuration of frequency component detector 105 using FIGS. 3A and 3B. The internal configurations respectively illustrated in FIGS. 3A and 3B may be employed for the internal configuration of frequency component detector 105. FIG. 3A illustrates a case where a single operating unit is used, and FIG. 3B illustrates a case where a parallel operation is performed using a plurality of operating units.

In this embodiment, a discrete Fourier transform (DFT) is used as a Fourier transform operating unit. DFT is an operation to extract a digital signal into each pre-set time window and to perform a Fourier transform, thereby extracting a plurality of frequency components of the digital signal. In general, DFT performs an operation of Equation 1 below. In Equation 1, "$x_q$" represents the q-th signal of a signal sequence inputted to the operating unit, "$S_k$" represents a frequency component of frequency "k" obtained by Fourier transform operation, where q=0 to N−1, and k=0 to N−1.

(Equation 1)

$$S_k = \sum_{q=0}^{N-1} x_q \exp\left(\frac{-j2\pi qk}{N}\right) \quad [1]$$

Equation 1 represents performing calculations N times in which "$x_0$" to "$x_{N-1}$" are all multiplied by $\exp(-j2\pi qk/N)$ and the results of the multiplication are added together to compute "$S_k$," while changing "k." Accordingly, when the number of times represented by "k," the operation amount can be reduced.

In the case of FIG. 3A, the single operation unit repeatedly performs the operation for q=0 to N−1, and k=0 to N−1. Thus, the circuit scale can be reduced compared with the case of FIG. 3B. Moreover, in the case of FIG. 3A, when the number of times represented by "k" for the operation is reduced, the operation time can be shortened compared with the related art.

In the case of FIG. 3B, the operation units corresponding to "k" each repeatedly perform the operation for q=0 to N−1. Thus, the operation time can be shortened compared with the case of FIG. 3A. Moreover, in the case of FIG. 3B, when the number of times represented by "k" for the operation is reduced, the circuit scale can be reduced compared with the related art.

In this embodiment, frequency component detector 105 performs a Fourier transform operation for the value of "k" indicated by operation range control section 106 in both of the cases of FIGS. 3A and 3B. Accordingly, the operation amount of Fourier transform can be reduced in this embodiment.

Figure 4:
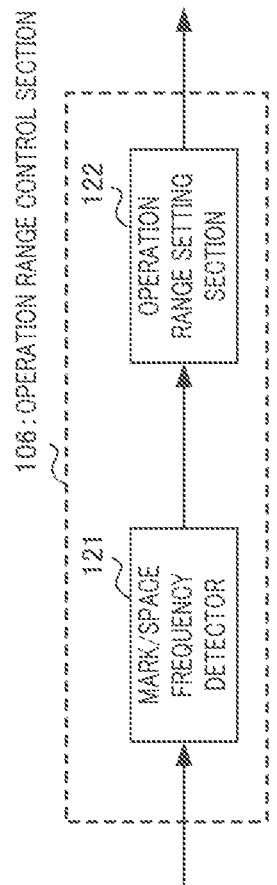
FIG. 4 is a block diagram illustrating a configuration of an operation range control section of the receiving apparatus according to the embodiment of the present disclosure.

Next, a description will be given of an internal configuration of operation range control section 106 with reference to FIG. 4. Operation range control section 106 includes Mark/Space frequency detector 121 and operation range setting section 122.

In the FSK modulation, the states of information signals ("0" or "1" in digital signals) are assigned to mutually different frequencies. More specifically, the digital signal "1" is assigned to a frequency of +ΔS from center frequency (direct-current component) $S_0$ of the carrier wave, and the digital signal "0" is assigned to a frequency of −ΔS from center frequency $S_0$. This frequency of $S_0$+ΔS is referred to as the Mark frequency, and a frequency of $S_0$−ΔS is referred to as the Space frequency.

Figure 5:
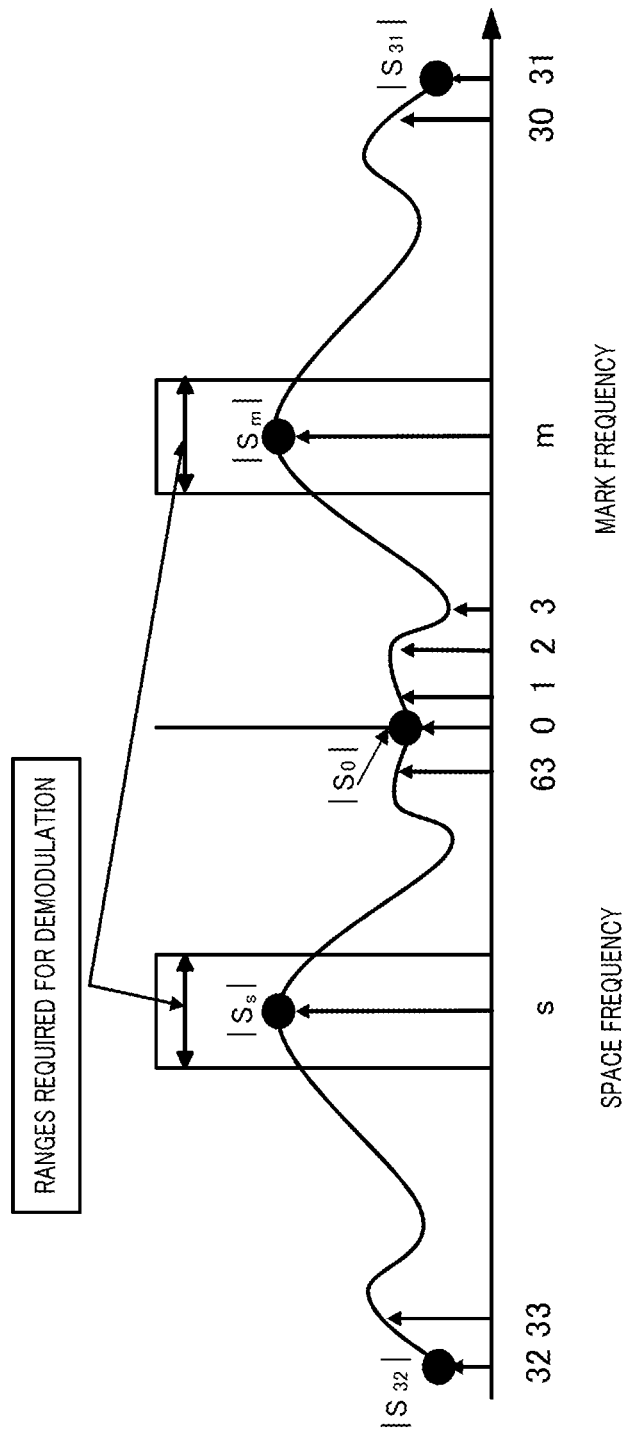
FIG. 5 is a diagram illustrating a frequency spectrum of an FSK modulation signal according to the embodiment of the present disclosure.

FIG. 5 is a diagram illustrating a frequency spectrum of an FSK modulation signal. The horizontal axis of the diagram in FIG. 5 represents the frequency and the vertical axis of the same represents the reception level. Note that, FIG. 5 illustrates an example when N=64. As illustrated in FIG. 5, the frequency spectra of frequency components $S_k$ outputted from frequency component detector 105 are substantially symmetric with respect to center frequency (direct-current component) $S_0$ of the carrier wave, and the reception level peaks in Mark frequency $S_m$ among the positive frequency components ($S_1$ to $S_{31}$), and the reception level peaks in Space frequency $S_s$ among the negative frequency components ($S_{32}$ to $S_{63}$).

Mark/Space frequency detector 121 detects a peak value of the reception level among the positive frequency components and detects the frequency corresponding to the peak value as the Mark frequency. Likewise, Mark/Space frequency detector 121 detects a peak value of the reception level among the negative frequency components and detects the frequency corresponding to the peak value as the Space frequency. Mark/Space frequency detector 121 outputs information indicating the detected Mark frequency and Space frequency to operation range setting section 122.

Operation range setting section 122 sets a predetermined band including the Mark frequency and Space frequency to be a frequency range for Fourier transform operation, and outputs a control signal indicating "k" corresponding to the set range to frequency component detector 105.

Examples of the method of setting the range in operation range setting section 122 include the following three methods (1), (2), and (3): (1) a method of setting a frequency range of ±α from the Mark frequency or Space frequency serving as the center of the range ("α" is a previously set fixed value); (2) a method of setting a frequency range having a constant proportion with respect to the reception level of the Mark frequency or Space frequency; and (3) a method of setting a width of a frequency range in accordance with the gap between the Mark frequency and Space frequency. As an example of method (3), the following setting may be possible: the range of ±10% from the Mark frequency and Space frequency serving as the center of the range is set when the gap between the Mark frequency and Space frequency is 100 kHz, and the range of ±15% from the Mark frequency and Space frequency serving as the center of the range is set when the gap between the Mark frequency and Space frequency is 200 kHz, for example.

Note that, when the Mark frequency and Space frequency are detected, the modulation mode can be estimated by computing the transmission rate using Equation 2 below. In Equation 2, "Rate" represents the transmission rate, "Mark" represents the Mark frequency, and "Space" represents the Space frequency.

(Equation 2)

$$\text{Rate} = \frac{\text{Mark} - \text{Space}}{2} \quad [2]$$

For example, let us suppose a case where three kinds of modulation modes A, B, and C can be set as a system, and the transmission rates of modulation modes A, B, and C are 20 kbps, 50 kbps, and 100 kbps, respectively.

In this case, when Mark−Space=40 khz, the transmission rate is 20 kbps, so that it can be estimated that the receiving apparatus is in modulation mode A. Likewise, when Mark−Space=100 khz, the transmission rate is 50 kbps, so that it can be estimated that the receiving apparatus is in modulation mode B. Furthermore, when Mark−Space=200 khz, the transmission rate is 100 kbps, so that it can be estimated that the receiving apparatus is in modulation mode C.

In this manner, the receiving apparatus no longer has to receive in advance information indicating the modulation mode from a communication counterpart transmission apparatus, so that it is possible to improve the transmission efficiency.

Figure 6:
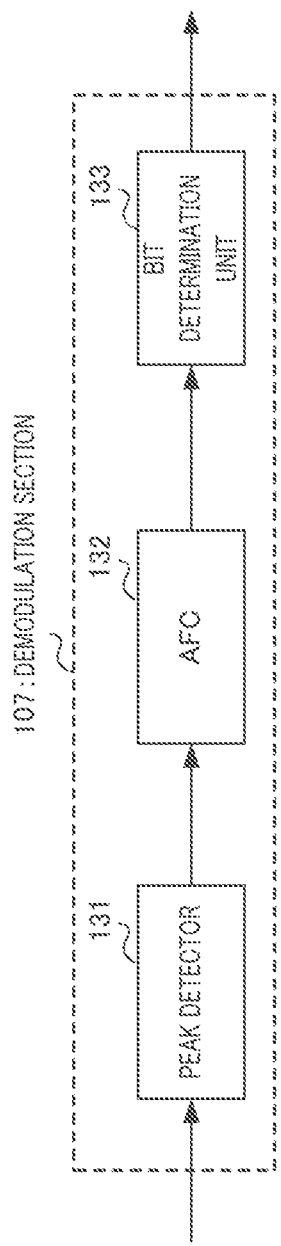
FIG. 6 is a block diagram illustrating a configuration of a demodulation section of the receiving apparatus according to the embodiment of the present disclosure.

Next, a description will be given of an internal configuration of demodulation section 107 with reference to FIG. 6. Demodulation section 107 includes peak detector 131, automatic frequency controller (AFC) 132, and bit determination unit 133.

Peak detector 131 detects a peak value of the reception level of the FFT signal outputted from frequency component detector 105 and outputs information indicating the frequency corresponding to the peak value (hereinafter, referred to as "peak frequency") to AFC 132.

Figure 7:
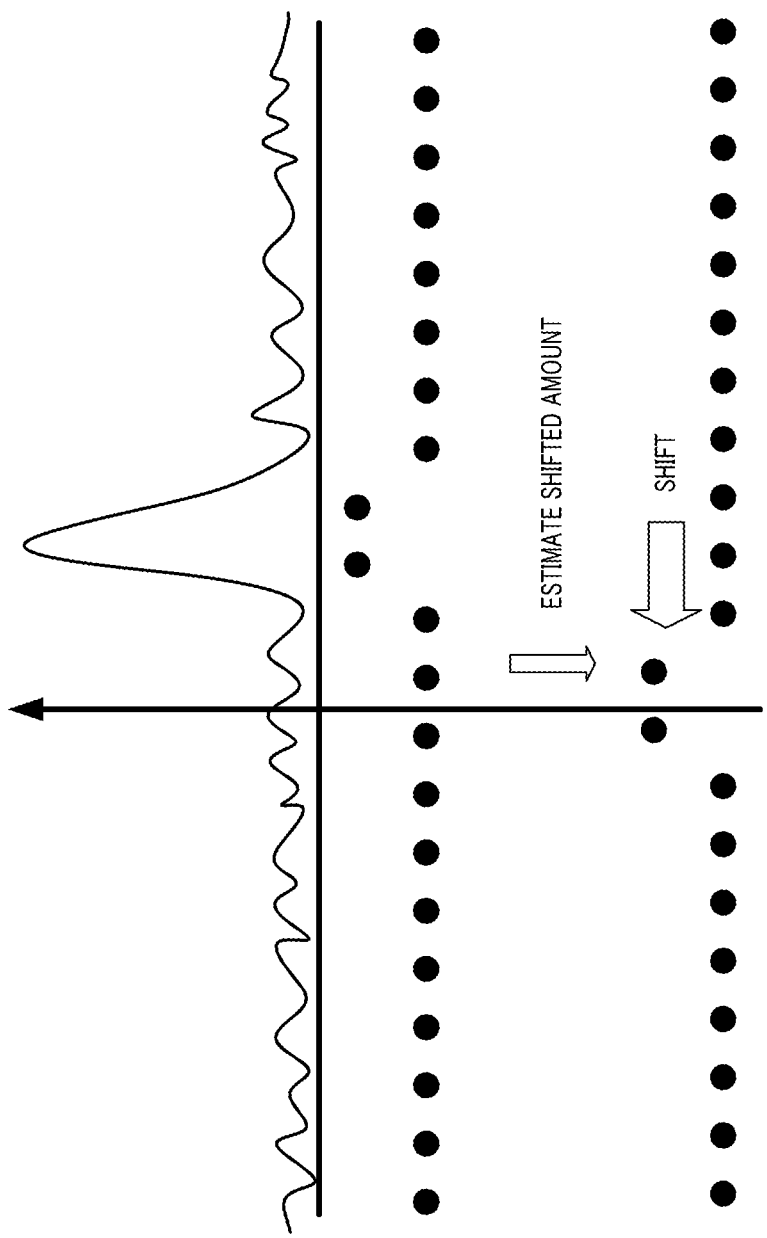
FIG. 7 is an image diagram illustrating an example of AFC according to the embodiment of the present disclosure.

As illustrated in FIG. 7, AFC 132 detects a shifted amount of the peak frequency from a temporal change between the last peak frequency and the peak frequency of this time and adjusts the frequency data to match the shifted amount.

Bit determination unit 133 determines a bit for each symbol based on the frequency data outputted from AFC 132 and decodes the bits into a digital signal formed of a predetermined number of bits and outputs the digital signal as a secondary demodulation data signal (demodulation data).

As described above, according to the present embodiment, the Mark frequency and Space frequency are detected from an FFT signal, and a Fourier transform operation is performed on only some frequency components including the Mark frequency and Space frequency, so that the operation amount of Fourier transform can be reduced.

Note that, when the frequency modulated signal is demodulated, a Fourier transform operation does not have to be performed on all the frequency components, and performing a Fourier transform operation on only a required part of the frequency components allows for obtaining sufficient demodulation accuracy. This is because demodulation requires only each FSK modulated information signal, and this signal is on the Mark frequency and Space frequency, and the frequency components other than the Mark frequency and Space frequency are noise components and are not required for demodulation.

Thus, according to the present disclosure, it is possible to reduce the operation amount of the frequency component detector, and also to achieve a reduction in circuit scale and power consumption in a receiving apparatus while keeping the advantage of being able to perform processing at high speed in the receiving apparatus.

Note that, although DFT, which is the simplest operation unit for extracting a frequency component, is used in the present embodiment, the present disclosure is not limited to DFT, and another operation unit such as a fast Fourier transform (FFT) or short time DFT (ST-DFT) may be used.

In addition, although a description has been given of the case where a frequency range is set based on the output signal of frequency component detector 105 in the embodiment described above, the present disclosure is not limited to this case, and another method such as setting a frequency range based on previously prepared modulation data may be used.

The disclosure of Japanese Patent Application No. 2012-284355, filed on Dec. 27, 2012, including the specification, drawings and abstract is incorporated herein by reference in its entirety.

INDUSTRIAL APPLICABILITY

The present disclosure makes it possible to achieve a reduction in circuit scale and power consumption in a receiving apparatus while keeping the advantage of being able to perform processing at high speed in the receiving apparatus. Thus, the present disclosure is suitable for use in a specified low power radio field such as a sensor radio network.

REFERENCE SIGNS LIST

100 Receiving system
101 Antenna
102 Mixer
103 Frequency synthesizer
104 ADC
105 Frequency component detector
106 Operation range control section
107 Demodulation section
200 Demodulation processing block
121 Mark/Space frequency detector
122 Operation range setting section
131 Peak detector
132 AFC
133 Bit determination unit

The invention claimed is:

1. A receiving apparatus that receives and demodulates a frequency-shift keying (FSK) modulated digital signal, the apparatus comprising:
    an operation range controller, which in operation, detects a Mark frequency and a Space frequency from a received frequency-shift keying (FSK) modulated digital signal and sets a frequency range for a Fourier transform operation, the frequency range being a first continuous determined range including the Mark frequency and a second continuous determined range including the Space frequency, the first continuous determined range being positive and greater than a center frequency, the center frequency being a frequency between the Space frequency and the Mark frequency, the second continuous determined range being negative and smaller than the center frequency;
    a frequency component detector, including Fourier transform operating circuitry, which in operation extracts a plurality of frequency components of the FSK modulated digital signal by performing "N" calculations using an equation:

$$S_k = \sum_{q=0}^{N-1} x_q \exp\left(\frac{-j2\pi qk}{N}\right), \quad \text{(Equation 1)}$$

wherein "$x_q$" is a q-th signal of a signal sequence inputted to the frequency component detector, "$S_k$" is a frequency component of a frequency "k" obtained by the Fourier transform operation, where q=0 to N−1, and k=0 to N−1, detects a frequency component in the FSK modulated digital signal within the frequency range; and
    a demodulator that decodes the frequency component in the FSK modulated digital signal into a digital signal formed of a predetermined number of bits and outputs the decoded frequency component in the FSK modulated digital signal as a demodulation data signal,
wherein the first continuous determined range and the second continuous determined range are given as set fixed percentage values α, set in accordance with the reception level of the Mark frequency and the Space frequency, and set in accordance with the gap between the Mark frequency and the Space frequency.

2. The receiving apparatus according to claim 1, wherein the Mark frequency is a frequency corresponding to a peak value of a reception level among positive frequency components, and the Space frequency is a frequency corresponding to a peak value of a reception level among negative frequency components.

3. The receiving apparatus according to claim 1, wherein the operation range controller estimates a modulation mode based on the Mark frequency and Space frequency.

4. A demodulation method for a frequency-shift keying (FSK) modulated digital signal, the method comprising:
    detecting a Mark frequency and a Space frequency from a received frequency-shift keying (FSK) modulated digital signal;
    setting a frequency range used for the Fourier transform operation, the frequency range being a first continuous determined range including the Mark frequency and a second continuous determined range including the Space frequency, the first continuous determined range being positive and greater than a center frequency, the center frequency being a frequency between the Space frequency and the Mark frequency, the second continuous determined range being negative and smaller than the center frequency;
    detecting a frequency component in the FSK modulated digital signal within the frequency range by performing a Fourier transform operation by extracting a plurality of frequency components of the FSK modulated digital signal and performing "N" calculations using an equation:

$$S_k = \sum_{q=0}^{N-1} x_q \exp\left(\frac{-j2\pi qk}{N}\right), \quad \text{(Equation 1)}$$

wherein "$x_q$" is a q-th signal of a signal sequence inputted to the frequency component detector, "$S_k$" is a frequency component of a frequency "k" obtained by the Fourier transform operation, where q=0 to N−1, and k=0 to N−1;
    decoding the frequency component in the FSK modulated digital signal into a digital signal formed of a predetermined number of bits; and
    outputting the decoded frequency component in the FSK modulated digital signal as a demodulation data signal,
    wherein the first continuous determined range and the second continuous determined range are given as set fixed percentage values α, set in accordance with the reception level of the Mark frequency and the Space frequency, and set in accordance with the gap between the Mark frequency and the Space frequency.

5. The receiving apparatus according to claim 1, wherein the frequency component detector extracts a digital signal into each pre-set time window.

* * * * *